US011195127B2

(12) United States Patent
Akaishi et al.

(10) Patent No.: US 11,195,127 B2
(45) Date of Patent: Dec. 7, 2021

(54) TRANSPORT METHOD

(71) Applicant: ABeam Consulting Kabushiki Kaisha, Tokyo (JP)

(72) Inventors: Akira Akaishi, Tokyo (JP); Masaki Tomida, Tokyo (JP); Shinjiro Okuda, Tokyo (JP)

(73) Assignee: ABeam Consulting Kabushiki Kaisha, Tokyo (JP)

( * ) Notice: Subject to any disclaimer, the term of this patent is extended or adjusted under 35 U.S.C. 154(b) by 18 days.

(21) Appl. No.: 16/642,124

(22) PCT Filed: Mar. 2, 2018

(86) PCT No.: PCT/JP2018/008098
§ 371 (c)(1),
(2) Date: Feb. 26, 2020

(87) PCT Pub. No.: WO2019/049396
PCT Pub. Date: Mar. 14, 2019

(65) Prior Publication Data
US 2020/0356930 A1 Nov. 12, 2020

(30) Foreign Application Priority Data

Sep. 8, 2017 (JP) .............................. JP2017-172874
Dec. 19, 2017 (JP) .............................. JP2017-243082

(51) Int. Cl.
*G06Q 10/06* (2012.01)
*G06F 8/60* (2018.01)
(Continued)

(52) U.S. Cl.
CPC ......... *G06Q 10/06313* (2013.01); *G06F 8/60* (2013.01); *G06F 8/63* (2013.01); *G06F 11/368* (2013.01); *G06Q 10/06312* (2013.01)

(58) Field of Classification Search
CPC . G06F 8/60; G06F 8/63; G06F 11/368; G06Q 10/06312; G06Q 10/06313
See application file for complete search history.

(56) References Cited

U.S. PATENT DOCUMENTS 8,978,029 B2 * 3/2015 Schwaninger ............ G06F 8/61
717/177
2004/0128668 A1 7/2004 Iuchi
(Continued)

FOREIGN PATENT DOCUMENTS

CN 1459758 12/2003
CN 101281624 10/2008
(Continued)

OTHER PUBLICATIONS

PCT International Search Report and Written Opinion in International Application No. PCT/JP2018/008098, dated May 29, 2018, 8 pages (with English translation).

*Primary Examiner* — S. Sough
*Assistant Examiner* — Stephen D Berman
(74) *Attorney, Agent, or Firm* — Fish & Richardson P.C.

(57) ABSTRACT

A transfer method controls transfer of a template in a system (1) that supports introduction of an ERP package for a plurality of customer companies. The template includes: a plurality of software modules necessary for performing a plurality of functions including functions tailored to a plurality of industries or functions tailored to part of the industries; and a plurality of parameter settings used for determining operations of the software modules. The transfer method includes: a reception step of receiving an instruction to transfer a template; and a transfer step of transferring, on receiving the instruction to transfer a template, a plurality of software modules and a plurality of parameter settings which are included in the template from a first server (20)
(Continued)

used for developing the template to a second server (30) used for performing a test for each customer company.

5 Claims, 8 Drawing Sheets

(51) Int. Cl.
*G06F 11/36* (2006.01)
*G06F 8/61* (2018.01)

(56) References Cited

U.S. PATENT DOCUMENTS

| | | |
|---|---|---|
| 2004/0249689 A1 | 12/2004 | Naraki et al. |
| 2007/0067338 A1 | 3/2007 | Koizumi et al. |
| 2008/0244047 A1 | 10/2008 | Yeung et al. |
| 2013/0124919 A1 | 5/2013 | Subramaniam |
| 2013/0212129 A1* | 8/2013 | Lawson ............... H04L 67/18 707/779 |
| 2013/0305244 A1* | 11/2013 | Pohlmann ............ G06F 9/455 718/1 |
| 2014/0283008 A1* | 9/2014 | Daino ............... G06F 21/6218 726/17 |

FOREIGN PATENT DOCUMENTS

| | | |
|---|---|---|
| EP | 1978672 A1 | 10/2008 |
| GB | 2398142 | 8/2004 |
| JP | 2002-163106 | 6/2002 |
| JP | 2004-252951 | 10/2007 |
| JP | 2008-257675 | 10/2008 |
| JP | 2004-206461 | 7/2013 |
| KR | 2009-0003059 | 1/2009 |
| WO | WO 2003/098430 | 11/2003 |
| WO | WO 2012/167190 | 12/2012 |

\* cited by examiner

FIG.5

AUTHORITY SETTING PARAMETER

| USER ID | ACCESSIBLE ORGANIZATION CODE | USABLE TRANSACTION CODE |
|---|---|---|
| 0001 | 1100 | C001, C002, C003 |
| 0002 | 1200 | C001, C002, C003 |
| 0003 | 3000 | C001, C002, C106 |
| 0004 | 5000 | C001, C104, C105 |
| ... | | ... |

TRANSPORT METHOD

CROSS-REFERENCE TO RELATED APPLICATION

This application is a National Stage Application under 35 U.S.C. § 371 and claims the benefit of International Application No. PCT/JP2018/008098, filed Mar. 2, 2018, which is based on Japanese application number (Japanese Patent Application Number) 2017-172874 filed on Sep. 8, 2017 and Japanese application number (Japanese Patent Application Number) 2017-243082 filed on Dec. 19, 2017, the contents of which are incorporated by reference herein.

TECHNICAL FIELD

The present invention relates to a transfer method that controls transfer of a template.

BACKGROUND ART

In systematizing basic operations in a company, introduction of a software package product called an ERP (Enterprise Resource Planning) system is widely performed. In a typical ERP package, functions tailored to various operations that are considered to be necessary for company management, for example, physical distribution management, quality control, financial accounting management, and the like are implemented.

The ERP package is designed for general use so as to be introducible to every company and can be variously customized by performing parameter settings according to system specifications required by an introduction destination company. However, the ERP package includes a large number of customization items and requires a high skill level for actual customization. In addition, if functions corresponding to the needs of a customer company are not implemented in an ERP package that is provided from a vendor, it is also necessary to develop an add-on (additional program) according to the needs of the customer company. Therefore, companies, in introduction of an ERP package, commonly uses a consulting company that supports introduction of ERP packages.

Consulting companies that support introduction of an ERP package preliminarily perform, in many cases, parameter settings, development of add-ons, and testing for achieving functions that are assumed to be required in introduction of the ERP package to customer companies, so as to reduce a period that is required before introduction of the ERP package to the companies. The ERP package that is obtained by incorporating the preliminarily created parameter settings and add-ons into an ERP package provided from an ERP vendor as described above is called a "template."

CITATION LIST

Patent Literature

[Patent Literature 1]
Japanese Patent Laid-Open No. 2004-252951

SUMMARY OF INVENTION

For consulting companies, it is necessary to quickly introduce an ERP package to customer companies of various industries and therefore, it is common to preliminarily prepare a plurality of templates for every industry, select a template according to an industry of a customer company, and perform customization. However, while the introduction of an ERP package to a customer company becomes easy due to preliminary preparation of templates, if, for example, a large change is made to an ERP package which is provided from an ERP manufacturer, it is necessary to perform again a test or the like for checking whether or not the template operates correctly. In such a case, if a template that is different for each industry has been prepared, it is necessary to perform a test or the like for each template; and there are problems that this may impose a large burden on the consulting company and a period before introduction of an ERP package to a customer company may become long.

That is, a merit of allowing quick introduction of an ERP package to a customer company exists due to use of the templates; whereas, a demerit of causing operation required for the test or the like to be accordingly increased exists.

Therefore, it is an object of the present invention to provide a technique that allows a consulting company which provides a template for various industries to efficiently introduce an ERP package using the template.

A transfer method according to one aspect of the present invention is a transfer method for controlling transfer of a template in a system that supports introduction of an ERP package for a plurality of customer companies. The template includes: a plurality of software modules necessary for executing a plurality of functions including functions tailored to a plurality of industries or functions tailored to part of the industries; and a plurality of parameter settings used for determining operations of the plurality of software modules. The transfer method includes: a reception step of receiving an instruction to transfer a template; and a transfer step of transferring, on receiving the instruction to transfer a template, a plurality of software modules and a plurality of parameter settings included in the template from a first server used for developing the template to a second server used for performing a test for each of the customer companies.

Advantageous Effects of Invention

According to the present invention, a technique that allows a consulting company which provides a template for various industries to efficiently introduce an ERP package using a template can be provided.

BRIEF DESCRIPTION OF DRAWINGS

FIG. 5 shows an example of an authority setting parameter.

DESCRIPTION OF EMBODIMENTS

Figure 1:
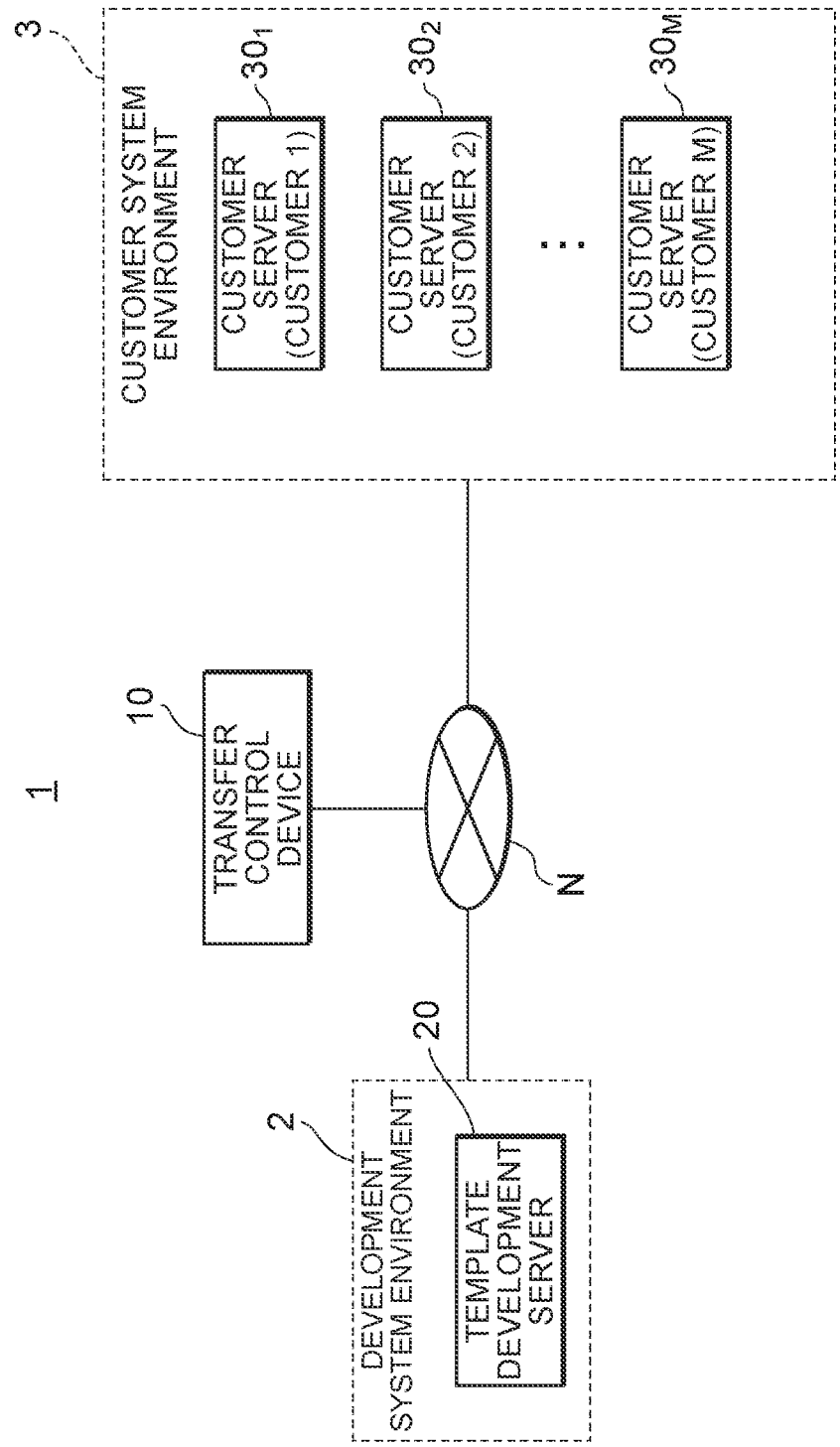
FIG. 1 shows an example of the entire configuration of an ERP management system according to the present embodiment.

A preferred embodiment of the present invention will be described with reference to the attached drawings. It should be noted that in the drawings, items denoted by the same reference sign have a same or similar configuration. In the present embodiment, an ERP package is described by using, as an example, an ERP package product (S/3, S/4HANA, SoH, etc.) provided by SAP (registered trademark); however, it is not intended to be limited thereto. The present embodiment is applicable also to ERP packages of companies other than SAP (registered trademark).

In the present embodiment, description will be given based on the premise that a consulting company which supports introduction of an ERP package to customer companies (hereinafter, referred to as "consulting company") adds specific settings for each of the customer companies (for example, logo mark setting, department name setting, and the like) to an ERP package into which a template has been incorporated and introduces the ERP package to the customer company.

<System Overview>

(System Configuration)

FIG. 1 shows an example of the entire configuration of an ERP management system 1 according to the present embodiment. The ERP management system 1 is a system that includes a server used by a consulting company which supports introduction of an ERP package to customer companies and a server used by the customer companies which introduce the ERP package; and can perform all of various operations from development of a template in the consulting company to operation of an ERP system (a system where the ERP package operates) on customer company sides.

The ERP management system 1 includes: a transfer control device 10; a template development server 20 used for performing development of templates, testing, and the like; and a customer server 30 used for operating ERP packages that have been introduced into customer companies. The transfer control device 10, the template development server 20, and the customer server 30 are connected by a communication network N and can communicate with each other.

The transfer control device 10 is a server that controls transfer performed between the servers which are included in the ERP management system 1. Definition of "transfer" will be described later. The transfer control device 10 controls transfer performed in the ERP management system 1, based on an instruction of a developer of the consulting company.

The template development server 20 is a server for the consulting company developing a template and add-ons and performing testing. Although, in FIG. 1, one template development server 20 is illustrated, a plurality of the template development servers 20 may be included.

Customer servers $30_1$ to $30_M$ are servers for performing testing of an ERP package which has been customized for each customer company, training for users in the customer company and the like regarding usage of an ERP package and the like, and operating an introduced ERP package; and basically, a different server is assigned for each customer company. In the description below, when the customer servers $30_1$ to $30_M$ are not especially distinguished from each other, they are called "customer server 30." In addition, although, in FIG. 1, one customer server 30 is illustrated for each customer company, it is for the sake of convenience of illustration and a plurality of the customer servers 30 may be included for each customer.

A development system environment 2 indicates a system environment that is mainly configured of a server used by the consulting company. In addition, a customer system environment 3 indicates a system environment that is mainly configured of servers used by customer companies. It should be noted that a classification between the development system environment 2 and the customer system environment 3 is merely a classification for the sake of convenience; for example, part of the customer server 30 (for example, a customer server 30 for testing) may be included in the development system environment 2.

(Overview of ERP)

Here, customization of an ERP package is performed by performing various parameter settings for an ERP package in an initial state which is provided by an ERP vendor. That is, performing parameter settings and performing customization have the same meaning. The set parameters are read by a plurality of software modules that constitute the ERP package in an initial state and the plurality of software modules perform operation according to the read parameter settings; and thereby, various functions which have been customized for a customer company are implemented.

In addition, for an ERP package, a mechanism allowing add-ons for implementing missing functions to be added is provided; and the consulting company can add any add-on as a part of a software module. It should be noted that unless otherwise specified, description below will be given on the assumption that the term "software module" includes software modules constituting an ERP package (that is, software modules provided from an ERP vendor) and add-ons which have been added by the consulting company.

Various functions that are implemented by an ERP package are each assigned with a specific number. The specific number is called a "transaction code." A developer in the consulting company, a user in the customer company, and the like can quickly call a screen of a function desired to be used, by inputting a transaction code on a screen of an ERP system in operation. Examples of the transaction code include, for example: transaction codes, which are mainly used by users in the customer company, such as a code for calling a screen for adding transaction data, a code for calling a screen for setting a home delivery company, and a code for calling a screen for registering a slip; and transaction codes, which are mainly used by developers in the consulting company, such as a code for calling a screen for performing transfer setting, a code for confirming a process in activation, and the like.

A template according to the present embodiment is not a template specialized in a specific industry but is configured so that all basic operations performed in various industries such as an automobile industry, a food industry, a high-technology industry, and the like are covered by one template. Specifically, the template according to the present embodiment includes: a plurality of software modules which are required for executing all of a plurality of functions that include functions required for all of these plurality of industries or functions required for a part of these industries; and a plurality of parameter settings which are used for determining the operations of the plurality of software modules. That is, the template according to the present embodiment can be tailored to customization of ERP packages for every customer company only by the one template.

In the present embodiment, transaction codes used by users in customer companies are set such that a different code value is associated with each function implemented by the template and further, a code value that corresponds to each function implemented by the template and is different also for each industry is assigned. For example, even as for a "function for registering a slip," a transaction code corresponding to a "function for registering a slip for an automobile industry" and a transaction code corresponding to a "function for registering a slip for a food industry" are assigned with different code values.

In addition, each of the plurality of parameter settings included in the template according to the present embodiment is classified into any of three categories indicated below:

"Category A1": parameter settings in which change and addition of parameter values are inhibited in principle, "Category A2": parameter settings in which operations for each industry are specified for the plurality of functions included in the template; change of parameter values is inhibited in principle. However, addition of parameter values is permitted in a case where a specific condition is satisfied, for example, such as when development for increasing industries supported by the template is performed, and "Category B": parameter settings in which setting (addition and/or change) is required for each customer company.

Parameter settings corresponding to category A1 are universal data that is independent of customer companies: for example, parameter settings for defining correspondence relations between country names and country codes. Parameter settings corresponding to category A1 have a possibility of influencing the operation of the entire ERP system if change and addition are performed; and therefore, change and addition are inhibited.

Parameter settings corresponding to category A2 are parameter settings for determining operations for each industry for the plurality of functions included in the template: for example, a parameter setting for defining a slip type (format) of sales slips and purchase order slips used in the automobile industry, a parameter setting for defining a slip type (format) of sales slips and purchase order slips used in the food industry, and the like. Parameter settings corresponding to category A2 have a possibility of influencing the operations of an ERP system of a company that uses parameter settings corresponding to category A2 if change is performed; and therefore, change is inhibited. However, there are cases in which addition of parameters is required, such as when development of a template is performed; and therefore, addition of parameters is permitted only when a specific condition is satisfied.

Parameter settings corresponding to category B are parameter settings different for each company: for example, a company code of a customer company, a factory name of a customer company, a list of account items used in a customer company, a definition, in a customer company, of an in-company organization structure, employee codes, and the like. Parameter settings corresponding to category B are parameter settings different for each customer company; however, in the present embodiment, basically, a developer in the consulting company performs the settings.

The ERP package is designed so as to allow a plurality of ERP systems to operate on one physical server (or one logical server such as a virtual server). In the ERP package, one ERP system that operates on a server is called "client."

That is, the term "client" in the ERP package does not mean a customer company but means one ERP system. This is implemented by logically separating various parameter settings for each client in a database provided in one server.

The term "transfer" means performing a copy (including a differential copy) of software modules constituting an ERP package and various parameter settings between servers. That is, performing "transfer" enables one or more ERP systems that operate on one server to be copied to another server as they are. In addition, in the transfer, a copy (including a differential copy) of only a certain client to another server can also be performed.

In the present embodiment, a template that is developed (either newly developed or upgraded) by the template development server 20 is transferred to all the customer servers 30 used for performing testing for each customer company. More specifically, a developed template is transferred to the customer servers 30 of all customer companies to which the consulting company provides the ERP package.

In the present embodiment, all functions for every industry are incorporated into one template; and therefore, even in a case where a large change is made to an ERP package, such as if an ERP package provided from an ERP vendor, itself, is significantly upgraded, it is only required that testing is performed for the one template.

Here, the template according to the present embodiment includes all the functions for every industry; and therefore, each customer company does not use all the functions provided by the template according to the present embodiment. That is, it is desirable that functions which are not used by a customer company out of the functions included in the template are inhibited from being started from the customer company. Therefore, in the present embodiment, a parameter setting (hereinafter, referred to as "authority setting parameter") for controlling, for each user in customer companies, whether or not to permit execution of each of the functions included in the template is defined so as to control for each customer company whether or not to permit execution of each of the functions. It should be noted that the authority setting parameter is a setting different for each customer company and therefore, it corresponds to a parameter of category B.

<Hardware Configuration>

Figure 2:
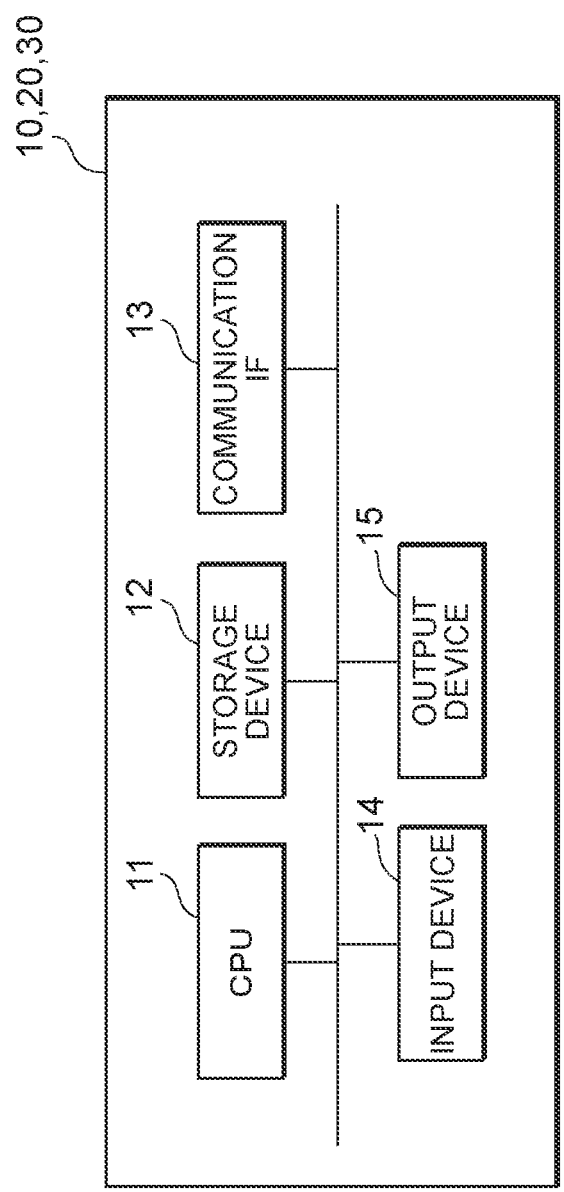
FIG. 2 shows an example of the hardware configurations of a transfer control device, a template development server, and a customer server.

FIG. 2 shows an example of the hardware configurations of the transfer control device 10, template development server 20, and customer server 30. As shown in FIG. 2, the transfer control device 10, the template development server 20, and the customer server 30 each include: a CPU (Central Processing Unit) 11; a storage device 12 such as a memory; a communication IF (Interface) 13 used for connecting with a communication network N; an input device 14 such as a keyboard; and an output device 15 such as a display.

The transfer control device 10, the template development server 20, and the customer server 30 each may be a physical server; alternatively, may be a cloud server or a virtual server.

<Function Block Configuration>

(Transfer Control Device)

Figure 3:
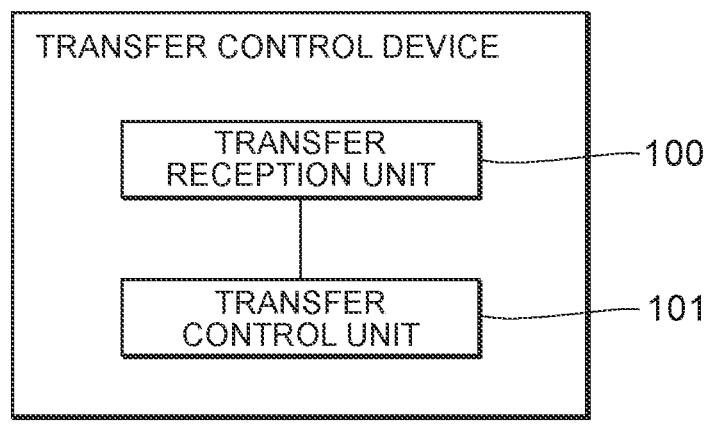
FIG. 3 shows an example of the function block configuration of the transfer control device.

FIG. 3 shows an example of the function block configuration of the transfer control device 10. The transfer control device 10 includes a transfer reception unit 100 and a transfer control unit 101. The transfer reception unit 100 and the transfer control unit 101 can be implemented by processing which a program stored in the storage device 12 of the transfer control device 10 makes the CPU 11 execute. In addition, the program can be stored in a recording medium.

The transfer reception unit 100 has a function of receiving a transfer instruction via a screen for controlling transfer from a developer of a consulting company. The transfer instruction includes, for example: an instruction about a server of a transfer source and an instruction about a server of a transfer destination (instruction about a transfer route); an instruction about a client number of a client to be transferred; and the like.

The transfer control unit 101 has a function of instructing the template development server 20 and the customer server 30 to transfer a template, based on the transfer instruction received by the transfer reception unit 100. More specifically, the transfer control unit 101 has a function of transferring all software modules and all parameter settings that are included in the template, from the template development server 20 to the customer server 30, based on the transfer instruction received by the transfer reception unit 100.

(Template Server, Customer Server)

Figure 4:
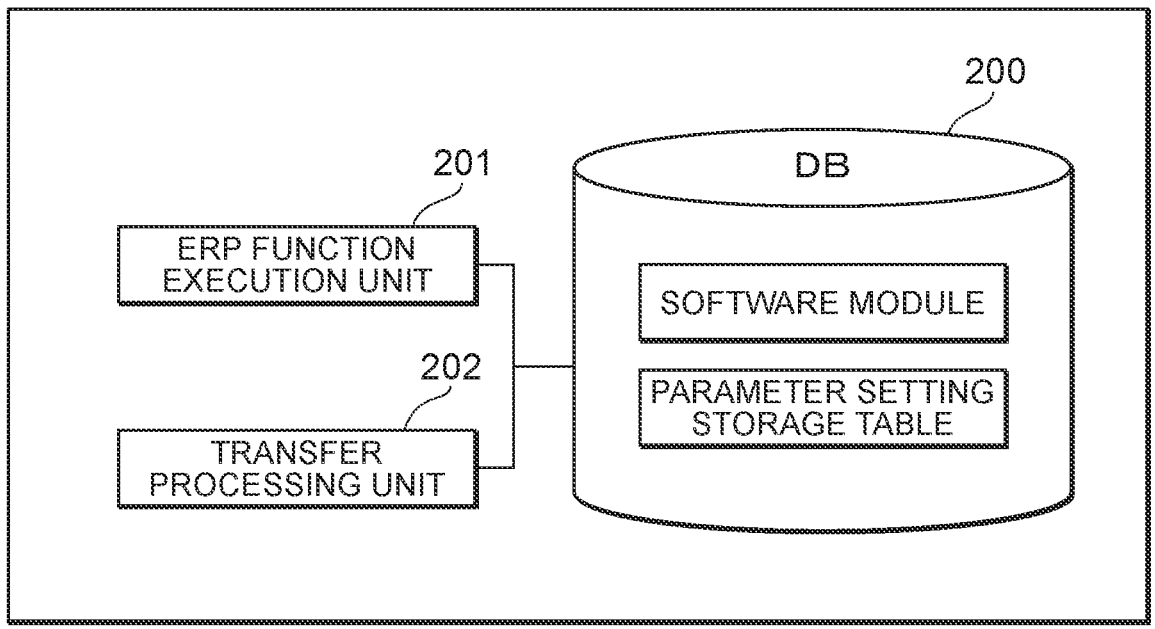
FIG. 4 shows an example of the function block configurations of the template development server and the customer server.

FIG. 4 shows an example of the function block configurations of the template development server 20 and the customer server 30. The template development server 20 and the customer server 30 each include a DB (database) 200, an ERP function execution unit 201, and a transfer processing unit 202. The ERP function execution unit 201 and the transfer processing unit 202 can be implemented by processing which a program stored in the storage device 12 of the template development server 20 or the customer server 30 makes the CPU 11 execute. In addition, the program can be stored in a recording medium. The recording medium that has stored the program may be a non-temporary storage medium. A DB 200 can be implemented by using the memory or storage device 12 which is included in the template development server 20 or the customer server 30.

In the DB 200, all the software modules included in a template and a parameter setting storage table are stored. In the parameter setting storage table, various settings that are required for operating various software modules provided from an ERP vendor and various parameter settings that are required for operating all add-ons are stored.

The ERP function execution unit 201 executes various functions implemented by the template. The various functions implemented by the template include, for example: a function related to physical distribution such as inventory management of a warehouse and shipping management of commodities; a function related to quality control such as inspection of a delivered commodity and management of a commodity to be returned; a function related to financial and accounting management such as a real-time display of a financial condition and operation capital; a function of collectively maintaining data related to commodities (commodity master); a function of displaying various reports from various viewpoints; and the like. Further, in addition to functions used by customer companies, functions used by a developer in a consulting company, such as a function of performing parameter setting (that is, customization) according to requirement specifications of the customer companies and a function of performing maintenance and the like of the DB 200 are also included. It should be noted that as functions implemented by the template, various functions other than the functions listed here exist.

The transfer processing unit 202 transfers, based on an instruction from the transfer control device 10, the software modules and parameter setting storage table which are stored in the DB 200, to another template development server 20 or another customer server 30 which is specified from the transfer control device 10. In addition, the transfer processing unit 202 obtains, based on an instruction from the transfer control device 10, the software modules and parameter setting storage table from the other template development server 20 or the other customer server 30 and stores them in the DB 200. In addition, the transfer processing unit 202 copies, when being instructed to copy a client within the same server by the transfer control device 10, the parameter setting storage table which is stored in the DB 200, thereby performing a copy of the client within the template development server 20 or the customer server 30.

FIG. 5 shows an example of the authority setting parameter. The authority setting parameter is one of various parameter settings which are stored in the parameter setting storage table. A "user ID" is an identifier for uniquely identifying a user in a customer company that uses an ERP system on the customer server 30. For an "accessible organization code," an organization code indicating organization data whose access authority has been given to the user is set. For an "available transaction code," one or more transaction codes whose access authorities have been given to the user are stored.

Here, within the ERP system, various data which is used in each of the functions included in the ERP system is accumulated. For example, in a function of managing business partners, processing of reading business partner data, in which a list of business partners is stored, is performed so as to display on a screen a current list of business partners. In the ERP system, an organization code is set for each kind of data so as to indicate which organization the data is used in. For example, for business partner data in which a business partner name of factory A is stored, an organization code of factory A is set; and for business partner data in which a business partner name of head office B is stored, an organization code of head office B is set. The above-mentioned "accessible organization code" indicates which organization data, out of those kinds of data, each user can access. For example, a user for which factory A is set by the "accessible organization code," can access business partner data of factory A by using the function of managing business partners but cannot access business partner data of head office B.

An example in FIG. 5 means that a user whose user ID is "0001" can access data which is used in the organization of "1100" via a function corresponding to the transaction codes of "C001," "C002," and "C003" but cannot access data which is used in the organization of "1200."

In the present embodiment, by associating usable transaction codes with user IDs, usable transaction codes can be assigned for each customer company. For example, supposing that a customer company A that is involved in the manufacture of automobiles and a customer company B that is involved in the wholesaling of medicines exist and an ERP package includes a function related to the quality control of automobiles and a function related to the quality control of medicines. In this case, for example, for a user belonging to a customer company A, a transaction code corresponding to a function related to the quality control of automobiles is set for the "usable transaction code;" and for a user belonging to a customer company B, a transaction code corresponding to a function related to the quality control of medicines is set for the "usable transaction code." As a result, the user belonging to the customer company B becomes unable to use the function related to the quality control of automobiles. Similarly, the user belonging to the customer company A becomes unable to use the function related to the quality control of medicines. As described above, in the present embodiment, for transaction codes used by users in the customer companies, code values that correspond to each of the functions implemented by the template and are different for each industry are assigned. Therefore, by setting only the transaction codes of functions related to the industry of a customer company for the "usable transaction code," it becomes possible that the functions of industries which are not related to the industry of the customer company are not allowed to be used by (not allowed to be accessed from) users in the customer company.

<Transfer Procedures>

(Basic Example)

Figure 6:
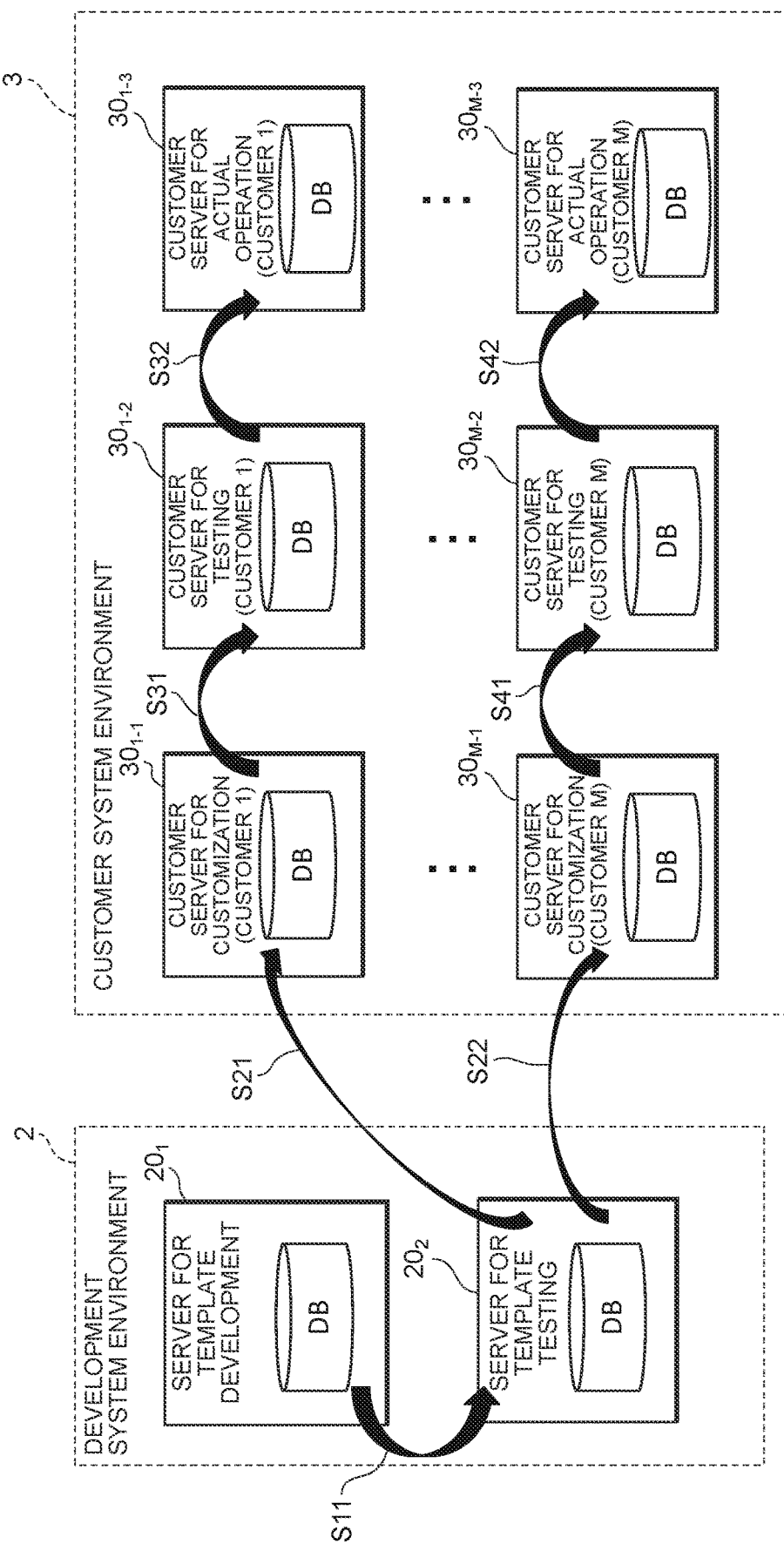
FIG. 6 shows a view for explaining a series of operations (basic example) from development of a template to introduction of an ERP package to customer companies.

FIG. 6 shows a view for explaining a series of operations (basic example) from development of a template to introduction of an ERP package to customer companies. Here, the development system environment 2 includes, for example: a template development server 20 (server for template development $20_1$) used for performing coding of a template, and the like; and a template development server 20 (server for template testing $20_2$) used for performing testing of a developed template. In addition, the customer system environment includes: a customer server 30 (customer servers for customization $30_{1-1}$ to $30_{M-1}$) used for creating an ERP package for each customer company by customizing the template; a customer server 30 (customer servers for testing $30_{1-2}$ to $30_{M-2}$) for performing quality check testing for the ERP package for each customer company; and a customer server 30 (customer servers for actual operation $30_{1-3}$ to $30_{M-3}$) for bringing a final ERP package, for which customization and quality check testing are complete, into operation.

At step S11, the transfer processing unit 202 of the server for template development $20_1$ that has received an instruction of the transfer control device 10 transfers a developed template to the server for template testing $20_2$. In the template transferred, all the software modules and all the parameter settings (all the parameter settings corresponding to category A1, category A2, and category B) that are included in the template are included. It should be noted that in parameter settings belonging to category B out of the parameter settings, data for testing that is temporary data created for performing testing of a template is set. On the server for template testing $20_2$, quality check testing, such as the operation check, performance testing, and the like of the template, is performed.

At step S21 and step S22, the transfer processing unit 202 of the server for template testing $20_2$ that has received an instruction of the transfer control device 10 transfers the template for which the quality check testing is complete to the customer servers for customization $30_{1-1}$ to $30_{M-1}$. In the present embodiment, the transfer control device 10 instructs the server for template testing $20_2$ to transfer the template for which the quality check testing is complete to all the customer servers for customization $30_{1-1}$ to $30_{M-1}$ which are included in the ERP management system 1. On the customer servers for customization $30_{1-1}$ to $30_{M-1}$, customization of the template is performed in accordance with required specifications of respective customer companies (customer 1 to customer M) and an ERP package for each of the customer companies is generated. Specifically, a developer in a consulting company generates an ERP package for each customer company by changing the parameter settings belonging to category B (including the authority setting parameter) to values tailored to required conditions of the customer company. It should be noted that if an ERP system is already operating in an actual operation environment and a function which is to be added by transfer performed at step S21 and step S22 is a function that is not related to functions used by a relevant customer company, a customization work is omitted.

At step S31 and step S41, the transfer processing units 202 of the customer servers for customization $30_{1-1}$ to $30_{M-1}$ that have received an instruction of the transfer control device 10 transfer the ERP package for each customer company to the customer servers for testing $30_{1-2}$ $30_{M-2}$. In the ERP package transferred, all the software modules included in the template, parameter settings corresponding to category A1, parameter settings corresponding to category A2, and parameter settings corresponding to category B which have been changed for each customer company are included. On the customer servers for testing $30_{1-2}$ to $30_{M-2}$, quality check testing of the ERP package for each customer company is performed. It should be noted that transfer at step S31 and step S41 are not simultaneously performed but is asynchronously performed according to the progress of the customization work.

At step S32 and step S42, the transfer processing units 202 of the customer servers for testing $34_{1-2}$ to $30_{M-2}$ that have received an instruction of the transfer control device 10 transfer a final ERP package, for which the quality check testing is complete, to the customer servers for actual operation $30_{1-3}$ to $30_{M-3}$. On the customer servers for actual operation $30_{1-3}$ to $30_{M-3}$, the ERP package operates and is used in daily operations of the customer companies.

If a change in the template (for example, upgrading) is performed in the procedures described above, differences in the software module and parameter settings between before-the-change and after-the-change are transferred in each transfer procedure. It should be noted that if parameter settings in category A1 or category A2 are changed due to a change in the template and transfer of a difference between before-the-change and after-the-change is performed, only the difference is transferred from the server for template testing $20_2$ to the customer server for customization $30_{1-1}$ to $30_{M-1}$. In this case, further if it is necessary to change parameter settings in category B for each customer company, an operation for the change and an operation for transferring the parameter settings in category B after the change can be performed at any timing for each customer company. Thus, the parameter settings in category A1 or category A2 are synchronized between the template development server 20 and each of the customer servers for customization 30 and therefore, differences in the parameter settings in category A1 and category A2 between the template development server 20 and each of the customer servers for customization 30 can be minimized. In addition, as for a change in the parameter settings in category B in the customer servers 30, the change can be made at a timing that is free to some extent.

Application Example 1

Figure 7:
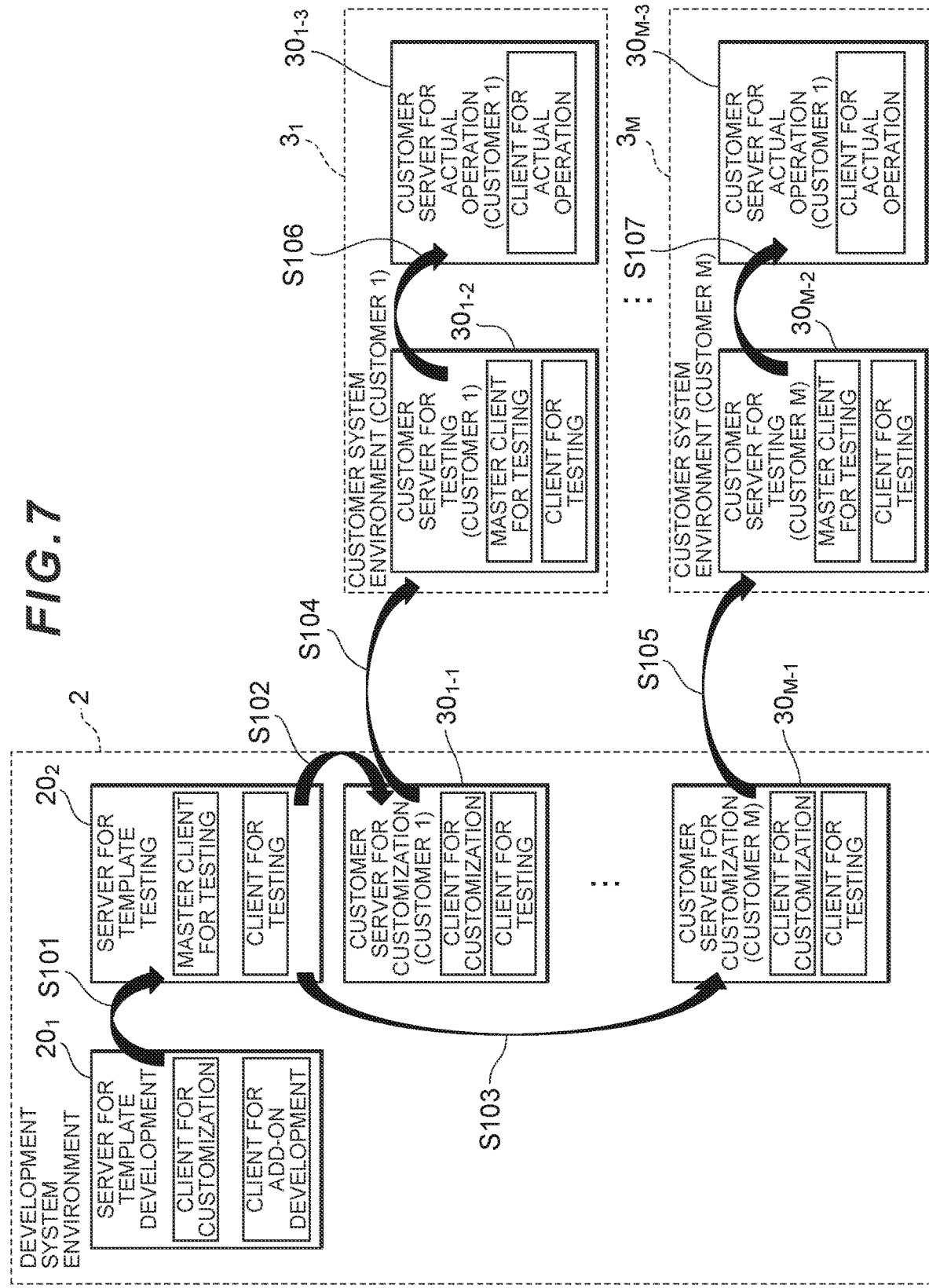
FIG. 7 shows a view for explaining a series of operations (application example 1) from development of a template to introduction of an ERP package to customer companies.

Next, a more detailed application example will be described based on the basic example described above. FIG. 7 shows a view for explaining a series of operations (application example 1) from development of a template to introduction of an ERP package to customer companies. In the application example 1, the customer servers for customization $30_{1-1}$ to $30_{M-1}$ used for customizing the ERP package for each customer company are arranged on a side of the development system environment 2.

On the server for template development $20_1$, for example, development of a template is performed so as to efficiently develop a template, by using a client for mainly performing addition, change, or the like of parameter settings (client for customization) and a client for performing coding of an add-on or the like (client for add-on development).

On the server for template testing $20_2$, by using a client for storing master data of an ERP package into which the developed template has been incorporated (master client for testing) and a client for actually performing quality check testing (client for testing), quality check testing of the ERP package is performed.

On the customer servers for customization $30_{1-1}$ to $30_{M-1}$, by using a client for customizing, for each customer company, the template for which the quality check testing is complete (client for customization) and a client for performing quality testing which has to be performed on the side of the development system environment 2 at minimum (client for testing), customization for each customer company is performed for the template.

On the customer servers for testing $30_{1-2}$ to $30_{M-2}$, by using a client for storing master data of an ERP package for each customer company (master client for testing) and a client for performing quality check testing (client for testing), quality check testing of the ERP package for each customer company is performed.

Step S101 corresponds to step S11 in FIG. 6. Step S102 and step S103 correspond to step S21 and step S22 in FIG. 6, respectively. Step S104 and step S105 correspond to step S31 and step S41 in FIG. 6, respectively. Step S106 and step S107 correspond to step S32 and step S42 in FIG. 6, respectively. Concrete descriptions are omitted since they are the same as those in FIG. 6.

Application Example 2

Figure 8:
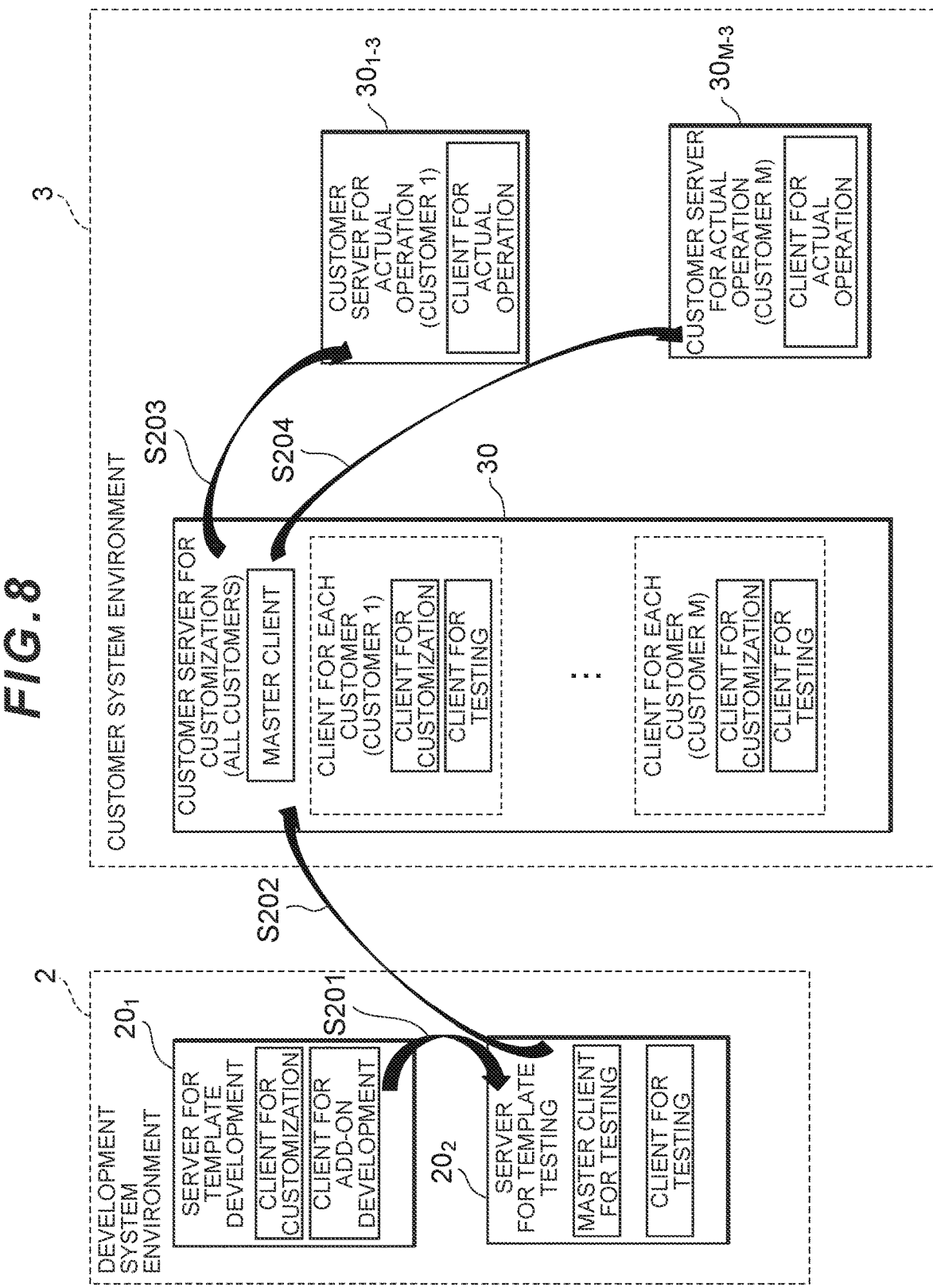
FIG. 8 shows a view for explaining a series of operations (application example 2) from development of a template to introduction of an ERP package to customer companies.

FIG. 8 shows a view for explaining a series of operations (application example 2) from development of a template to introduction of an ERP package to customer companies. In the application example 2, the customization work which is performed on the customer servers for customization $30_{1-1}$ to $30_{M-1}$ and quality check testing which is performed on the customer servers for testing $30_{1-2}$ to $30_{M-2}$ in FIG. 6 are performed on a client of each customer company which is prepared on one server (customer server for customization (all customers) 30). More specifically, a customization work performed on the customer servers for customization $30_{1-1}$ to $30_{M-1}$ is performed by using a client for customization within a "client for each customer (customer 1 to M)" which is included in a customer server for customization (all customers) 30; and quality check testing performed on each of the customer servers for testing $30_{1-2}$ to $30_{M-2}$ is performed by using a client for testing within a "client for each customer (customer 1 to M)" which is included in the customer server for customization (all customers) 30.

Step S201 corresponds to step S11 in FIG. 6. A concrete description will be omitted.

At step S202, the transfer processing unit 202 of the server for template testing $20_2$ that has received an instruction of the transfer control device 10 performs a transfer of a template for which the quality check testing is complete, as a master client of the customer server for customization (all customers) 30 (that is, performs a client copy). Next, the transfer processing unit 202 of the customer server for customization (all customers) 30 that has received an instruction of the transfer control device 10 performs a copy (including a differential copy) of the master client to the client for customization which is included in all the clients for each customer (customers 1 to M) to which the consulting company provides the ERP package. Processing of copying the master client to each of the clients for customization corresponds to the procedure, which has been described for step S21 and step S22 in FIG. 6, for transferring the template for which quality check testing is complete to all the customer servers for customization $30_{1-1}$ to $_{M-1}$ included in the ERP management system 1.

At step S203 and step S204, the transfer processing unit 202 of the customer server for customization (all customers) 30 that has received an instruction of the transfer control device 10 transfers a client of a final ERP package for which customization and quality check testing are complete, from the customer server for customization (all customers) 30 to the customer servers for actual operation $30_{1-3}$-$30_{M-3}$.

According to the embodiment described above, all functions for every industry are incorporated into one template; and therefore, even in a case where a large change is made to an ERP package, such as if an ERP package provided from an ERP vendor, itself, is significantly upgraded, it is only required that testing is performed for the one template. That is, according to the present embodiment, testing can be efficiently performed in comparison with a method of preparing a plurality of templates for each industry.

In addition, in the present embodiment, a parameter setting for controlling, for each customer company, whether or not to permit execution of each of the functions included in the template is defined so as to control whether or not to permit execution of each of the functions for each customer company. Thus, in a case where all functions for every industry are incorporated into one template, functions not related to a customer company can be inhibited from being started.

In addition, in the present embodiment, parameter settings are categorized into three categories of category A1, category A2, and category B. Especially, by defining category A2 that is of parameter settings for specifying operations for each industry, the operation of each function different for each industry is preset within a template in advance. This allows all functions for every industry to be incorporated into one template. In addition, a customer company using the template can use the functions incorporated into the template in advance, as functions tailored to the industry of its own company, allowing an introduction period of an ERP package to be shortened. Further, parameter settings corresponding to categories A1 and A2 are basically not changed and therefore, testing of the template can be efficiently performed.

The embodiment described above is for easy understanding of the present invention and is not for construing the present invention as being limited to it. The components included in the embodiment and their arrangement, material, condition, shape, size, and the like are not limited to those illustrated and can be appropriately changed. In addition, the components which are shown in different embodiments can be partially replaced with each other or combined.

A parameter setting belonging to category A1 is an example of the first parameter setting. A parameter setting belonging to category A2 is an example of the second parameter setting. A parameter setting belonging to category B is an example of the third parameter setting. The template development server 20, the server for template development $20_1$, or the server for template testing $20_2$ is an example of the first server. The customer server 30, the customer server for customization (customer 1) $30_{1-1}$ to the customer server for customization (customer M) $30_{M-1}$, or the customer server for customization (all customers) 30 is an example of the second server.

REFERENCE SIGNS LIST

1 ERP management system, 2 development system environment, 3 customer system environment, 10 transfer control device, 11 CPU, 12 storage device, 13 communication IF, 14 input device, 15 output device, 20 template development server, 30 customer server, 100 transfer reception unit, 101 transfer control unit, 200 DB, 201 ERP function execution unit, 202 transfer processing unit

The invention claimed is:

1. A transfer method for controlling transfer of a template in a system that supports introduction of an Enterprise Resource Planning (ERP) package for a plurality of customer companies, wherein
the template includes a plurality of software modules and a plurality of parameter settings, the plurality of software modules being necessary for performing a plurality of functions including functions tailored to a plurality of industries or functions tailored to part of the industries, the plurality of parameter settings being used for determining operations of the plurality of software modules; and
the transfer method includes:
a reception step of receiving an instruction to transfer the template; and
a transfer step of transferring, on receiving the instruction to transfer the template, the plurality of software modules and the plurality of parameter settings included in the template from a first server used for developing the template to a second server used for performing a test for each of the customer companies, the plurality of parameter settings include:
a first parameter setting for which change and addition of data are inhibited;
a second parameter setting, being a parameter setting for specifying operations for each of the industries for the plurality of functions, for which change of data is inhibited; and
a third parameter setting for which setting for each of the customer companies is required,
the third parameter setting includes an authority setting parameter for setting, for each user in the plurality of customer companies, whether or not to allow an execution of the plurality of functions that is to be achieved by the template, wherein in the authority setting parameter, a transaction code and an identifier are stored in association with each other, the transaction code being assigned a different code value for each of the industries and each function to be achieved by the template, the identifier allowing uniquely specifying a user in the plurality of customer companies.

2. The transfer method according to claim 1, wherein in the third parameter setting, data for testing is set, the data for testing being used for performing testing of the template on a server for testing included in the first server.

3. The transfer method according to claim 1, wherein
in the transfer step, the plurality of software modules and the plurality of parameter settings included in the template are transferred from the first server to all of the second server prepared for each of the customer companies.

4. The transfer method according to claim 1,
wherein
in the transfer step, the plurality of software modules and the plurality of parameter settings included in the template are transferred from the first server to the second server prepared in common for the plurality of customer companies.

5. The transfer method according to claim 1, wherein
the template includes the plurality of software modules and the plurality of parameter settings, the plurality of software modules being necessary for performing all of the plurality of functions including the functions tailored to the plurality of industries or the functions tailored to the part of the industries, the plurality of parameter settings being used for determining operations of the plurality of software modules.

* * * * *